United States Patent [19]

Murphy et al.

[11] 4,449,751

[45] May 22, 1984

[54] SEAT BACKREST HAVING AN ADJUSTABLE LUMBAR SUPPORT

[75] Inventors: Randall T. Murphy, Farmington Hills; Dennis H. Heling, Canton, both of Mich.

[73] Assignee: Lear Siegler, Inc., Livonia, Mich.

[21] Appl. No.: 267,127

[22] Filed: May 26, 1981

[51] Int. Cl.³ .......................... A47C 3/00; A47C 7/46
[52] U.S. Cl. .................................................... 297/284
[58] Field of Search ......................... 297/284; 267/89

[56] References Cited

U.S. PATENT DOCUMENTS

| 2,139,028 | 12/1938 | Mensendicck | 297/284 |
| 3,807,794 | 4/1974 | Beyer | 297/284 |
| 4,148,522 | 4/1979 | Sakurada et al. | 297/284 |
| 4,162,807 | 7/1979 | Yoshimura | 297/284 |
| 4,296,965 | 10/1981 | Sakurada et al. | 297/284 |

FOREIGN PATENT DOCUMENTS

| 2343712 | 5/1974 | Fed. Rep. of Germany | 297/284 |
| 2059497 | 4/1981 | United Kingdom | 297/284 |

Primary Examiner—Francis K. Zugel
Attorney, Agent, or Firm—Reising, Ethington, Barnard, Perry & Milton

[57] ABSTRACT

A seat backrest having an adjustable lumbar support is provided wherein the cam surface of a rotatable cam of a regulating mechanism, which adjusts the lumbar support, is effectively utilized to facilitate manual adjustment of the lumbar support. Rotation of the cam in a first direction cams a follower away from the axis of rotation of the cam. The follower causes an attached bar to rotate therewith. A lumbar support plate is supported by a cantilevered resilient or rigid element in the form of a leaf spring which is supported by the bar.

4 Claims, 4 Drawing Figures

SEAT BACKREST HAVING AN ADJUSTABLE LUMBAR SUPPORT

TECHNICAL FIELD

This invention relates generally to vehicle seats and more particularly to a seat backrest which includes a lumbar support regulating apparatus which is manually adjustable to provide a particular lumbar contour for the occupant of the seat.

BACKGROUND ART

One of the problems with standardized vehicle seats and, more particularly, automotive vehicle seats is that they do not fit every driver especially the supportive portions of the backrest of the seat. This is particularly true in the lumbar area where the small of the back of the driver engages the backrest. Lack of proper lumbar support can be a major factor in bringing on driving fatigue in a person driving a motor vehicle.

In general, the use of a lumbar support regulating apparatus in the seat back of a motor vehicle seat is known so that the hardness of the cushion of the seat back which is in contact with the lumbar region of the person seated on the seat can be suitably regulated.

For example, U.S. patent of Sandor U.S. Pat. No. 3,378,299 discloses pivoted lever members in the back seat. One arm of a lever engages the seat spring to vary the firmness thereof and the arm of the lever is connected to a cable which may be wound up on rotatable shaft to vary the force with which the lever is pressed against the seat spring.

Many manually adjustable lumbar pressure mechanisms cannot be conveniently adjusted by the seat occupant when the driver is in the vehicle seat. Such an adjustment is particularly difficult when the driver must make a multi-turn adjustment before the desired contour can be obtained.

Some prior patents attempted to overcome the difficulties associated with such manual adjustment mechanism by providing a power-driven lumbar support mechanism. For example, the U.S. patent of Beyer U.S. Pat. No. 3,807,794 discloses a lumbar support mechanism including a reversible power mechanism coupled to a shaft which is operable to vary the pressure applied to a supporting pressure member. Likewise, the U.S. patent of Easley U.S. Pat. No. 3,890,000 discloses a lumbar support member which is controlled by a motor-driven adjusting screw rod which operates a crank arm on a rock shaft carrying a lumbar support member in the form of a contoured plate.

Other prior patents disclose adjustable lumbar supports wherein the adjustment of the supports is accomplished at the side of the backrest by the seated occupant. For example, the U.S. patent of Hayashi U.S. Pat. No. 4,019,777 discloses a lumbar support regulating apparatus wherein a torsion spring is wrapped about a vertically extending post secured to the frame of a seat back. One arm of the torsion lever is secured to a plate which is disposed and in engagement with the seat springs and the opposite end of the torsion spring is engaged with a traveling nut threaded on a rotatable control shaft so that upon rotation of the shaft the force applied to the torsion spring will be varied to adjust the support pressure applied to the seat springs. Likewise, the U.S. patent of Yoshimura U.S. Pat. No. 4,162,807 discloses a lumbar support regulating apparatus wherein the torsion spring is wrapped about a vertically extending post, the ends of the springs being operatively engaged with a lumbar plate and wherein an intermediate portion of the spring extends outwardly from the post in engagement with the rotatable cam having surfaces of different radii engageable with the intermediate portion of the spring to vary the force of the torsion spring.

Other lumbar support regulating apparatus generally of the type to which this invention relates are disclosed by the U.S. patents of Obermeier et al U.S. Pat. No. 3,948,558, Obermeier et al U.S. Pat. No. 3,973,797 and Arndt et al U.S. Pat. No. 4,182,533.

The present invention provides an improved lumbar support regulating apparatus which eliminates many of the drawbacks associated with the above-mentioned conventional regulating devices.

DISCLOSURE OF THE INVENTION

An object of the present invention is to provide an improved lumbar support regulating apparatus which can be easily and manually adjusted while the driver is in the vehicle seat.

Another object of this invention is to provide a manually operated lumbar support regulating apparatus which can be readily installed in an existing seat back frame with only minor modifications and which is durable for long-term use.

A further object of the invention is to provide a manually adjustable lumbar support regulating apparatus which includes a rotatable cam to vary the position of a support plate wherein the surface of the cam is engaged by a follower which is configured so that such manual adjustment can be performed without jerks or excessive force being applied by the occupant.

In carrying out the above objects and other objects of this invention, a preferred embodiment of the lumbar support regulating apparatus includes a seat back having a rigid frame, a bar pivotally mounted on the frame for pivoting about a horizontal axis, and a lumbar support plate. A cantilevered resilient element is supported by the bar for, in turn, supporting the lumbar support plate. A rigid follower is included having first and second end portions. The first end portion of the follower is attached at one end of the bar to rotate therewith. A regulating mechanism is rotatably mounted on the frame and includes a cam rotatable about a cam axis wherein the cam has a radially disposed cam surface circumferentially extending in a first direction from a first lumbar support position through at least one intermediate lumbar support position to a last lumbar support position proximate the first lumbar support position. The cam surface is adapted for engagement by the second end portion of the follower so that rotation of the regulating means in the first direction between the first and last lumbar support positions cams the follower away from the axis of rotation of the cam to rotate the bar to thereby vary the position of the support plate.

Preferably, a first radial distance between the cam axis and the cam surface at the first lumbar support position is less than a second radial distance between the cam axis and the cam surface at the intermediate lumbar support position which, in turn, is less than a third radial distance between the cam axis and cam surface at the last lumbar support position. Also, preferably, the ratio of the difference between the first and second radial distances to the circumferential distance between the first and intermediate lumbar support positions is greater than the ratio of the difference between the second and third radial distances to the circumferential distance between the intermediate and last lumbar support positions to thereby provide a mechanical advantage so that the occupant of the seat can adjust the lumbar support plate without using excessive force.

The objects, features and advantages of the present invention are readily apparent from the following detailed description of the best mode taken in connection with the accompanying drawings.

BEST MODE FOR CARRYING OUT THE INVENTION

Figure 1:
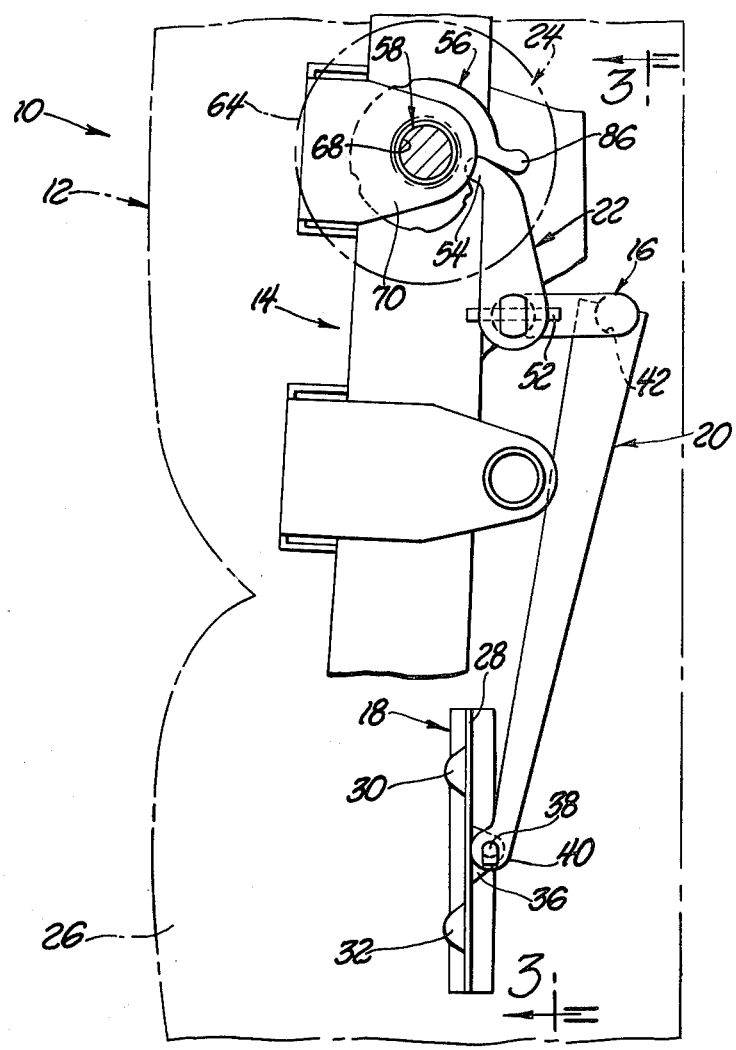
FIG. 1 is a fragmentary, partial sectional side view of a seat backrest embodying the present invention.

Referring to FIG. 1, a lumbar support regulating apparatus constructed according to the present invention is indicated collectively by reference numeral 10 and includes a seat back 12 having a rigid frame 14. A bar 16 is pivotally mounted on the frame 14. A lumbar support plate 18, a cantilevered rigid or resilient element which may take the form of a leaf spring 20, a rigid follower 22 and a manually operated regulating means are also mounted on the frame 14.

The seat back 12 may be pivotally connected in a conventional fashion to the seat portion of a vehicle seat or the seat back 12 may be fixedly mounted relative to the seat portion of the vehicle seat. In any event, the lumbar support plate 18 is located in position at the lumbar area of the seat back 12 in moving relation thereto and behind a cushioned backrest portion 26 of the seat back 12 whereby the backrest portion 26 can be adjusted in the lumbar area to accommodate the support needs of any particular user of the vehicle seat by a greater or lesser projection of the backrest portion 26 in the lumbar area after movement of the lumbar support plate 18 as will be described in greater detail hereinafter. The regulating apparatus 10 further maintains the selected comfort contour by preventing the lumbar support plate 18 from moving out of its selected position.

Figure 3:
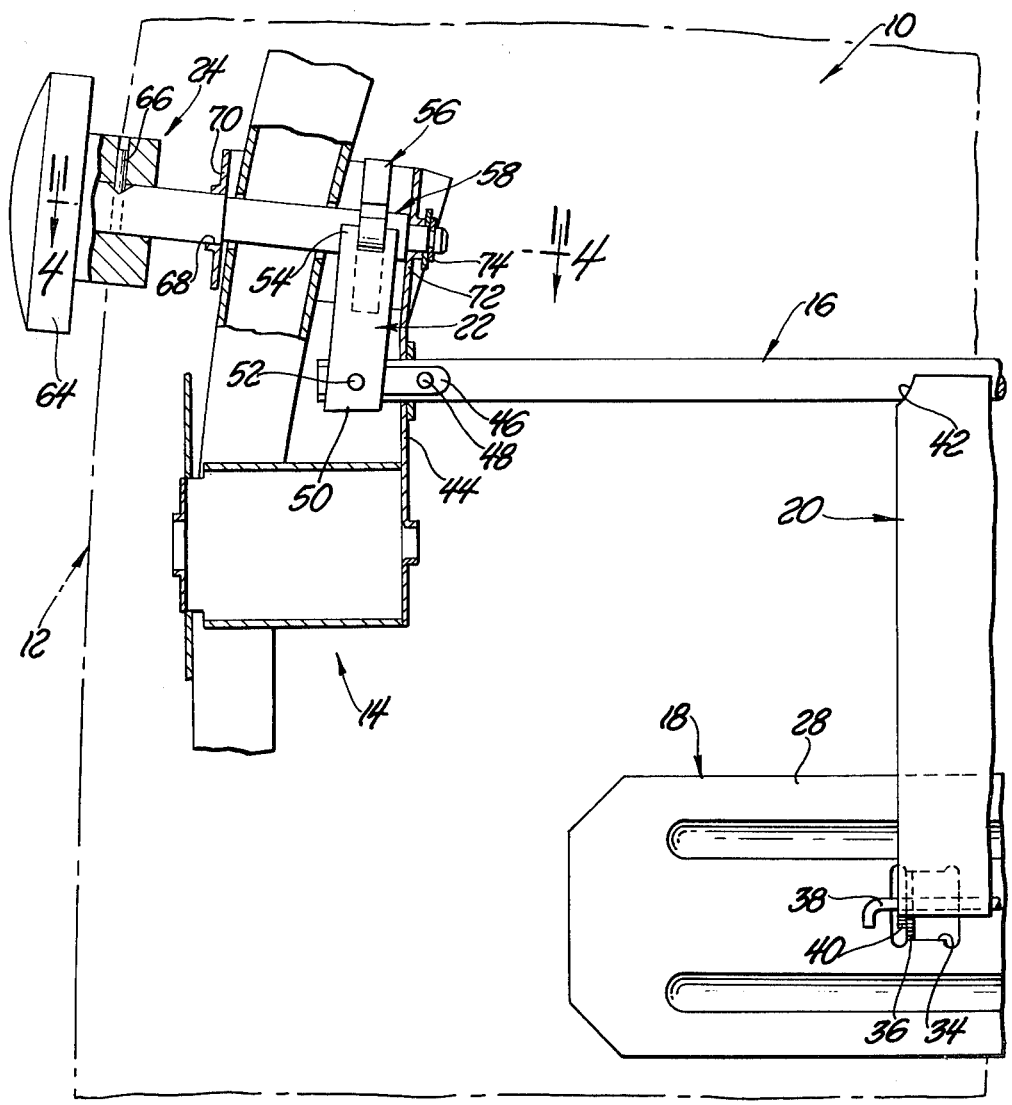
FIG. 3 is an end view, partially broken away and in cross-section, taken along line 3–3 of FIG. 1.
Figure 4:
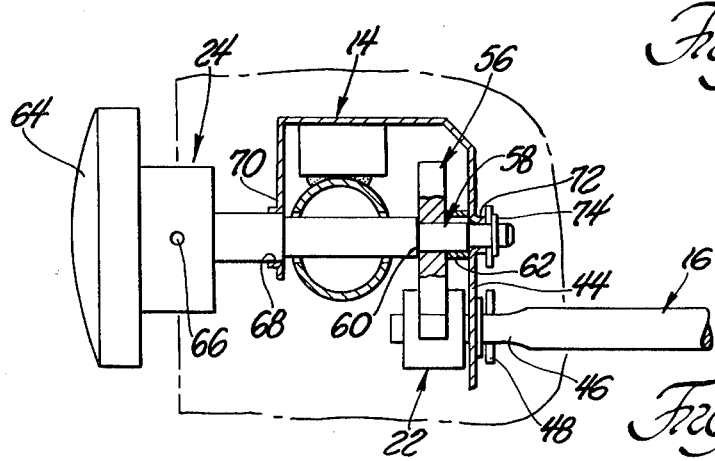
FIG. 4 is a top view, partially broken away and in cross-section, taken along line 4—4 of FIG. 3.

In the preferred form, the lumbar support plate 18 comprises a plate member 28 which may be either flexible or rigid. For reinforcement, the plate member 28 is provided with a pair of outwardly curved ridges 30 and 32. Material struck from a pair of apertures in the plate member 28, only one of which is shown at 34 in FIG. 3, provides rearwardly projecting pairs of parallel attachment ears 36 between and through which extend a connecting rod or pivot 38 also received through flanges 40 on the lower end portion of the downwardly extending spring leaf member 20. The upper end portion of the spring leaf member 20 is formed with an upwardly extending groove 42 and receives therein a central portion of the bent rod 16 and is fixedly secured thereto, such as by welding. The frame 16 and, in particular, a sheet metal plate 44 thereof, pivotally supports one end portion 46 of the bar 16. The opposite end portion of the bent rod 16 is also supported for pivotal movement but is not shown for the sake of simplicity.

The supported end portion 46 of the bent rod 16 is secured to the plate 44 by a transversely extending pin 48 which extends through the bent rod 16 at the end portion 46.

A lower end portion 50 of the follower 22 is fixedly secured to the end portion 46 of the bent rod 16 by a pin 52 which extends through the end portion 50 and the end portion 48. An upper end portion or tongue 54 of the follower 22 is adapted to ride upon or follow the outer circumferential surface of a cam 56 of the regulating mechanism 24. The cam 56, which may be made of any suitable plastic or metal, is secured on a keyed portion 59 of a shaft 58 between an enlarged shoulder portion 60 of the shaft and a bearing 62. The operating shaft 58 has a handle 64 mounted on the opposite end thereof and is fixedly secured thereto by a pin 66. The shaft 58 is rotatably supported in an aperture 68 extending through a front collar portion 70 of the frame 14. The shaft 58 is also rotatably supported in a rear collar portion 72 of the frame 14. The cam 56 is rotated by turning the handle 64 which rotates the shaft 58. A retaining ring 74 holds the shaft 58 on the frame 14.

Figure 2:
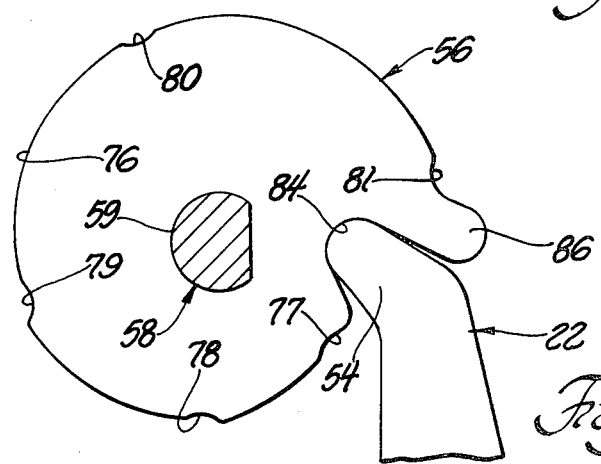
FIG. 2 is a side sectional view partially broken away and in cross-section of a cam and follower enlarged for illustrative purposes.

As best shown in FIGS. 1 and 2, the cam 56 is provided with a single cam face 76 which is adapted to engage the tongue 54 of the follower 22. In order to more securely hold the cam 56 in each regulating position, the cam surface 76 is provided with recesses 77, 78, 79, 80 and 81 in which the tongue 54 of the follower 22 will rest in each adjusted position. Those portions of the cam surface 76 between adjacent recesses are gradually sloping except for that portion between the recesses 81 and 84. The recesses 77 through 80 are formed in the cam surface 76 such that when the tongue 54 is disposed in any one of the recesses 77 through 80, the force transmitted to the follower 22 from the leaf spring 20 is directed towards the center of the axis of rotation of the cam 56 so as not to create any forces which would rotate the cam 56.

Upon rotation of the cam 56 in a first counterclockwise direction, the tongue 54 will move upwardly out of an indented portion 84 of the cam 56 to place the tongue 54 in a first recess 77 which represents a first lumbar support position. As long as the tongue 54 is in the indented portion 84, the support plate 18 is in its free, non-supportive position as shown in FIG. 1. Thereafter, further rotation of the cam 56 causes the tongue 54 to smoothly ride along the cam surface 76 to one of the intermediate recesses 78, 79 or 80. When the cam face 76 between the recesses 77 and 78 is engaged with the tongue 54 of the follower 22, the support provided by the backrest portion 26 will be relatively slight since the force acting on the leaf spring 20 through the lumbar support plate 18 is relatively weak. When the tongue 54 of the follower 22 engages those portions of the cam face 76 between the recesses 78 and 79 and between recesses 79 and 80, respectively, the hardness of the rest portion 26 will become progressively harder and harder, respectively, due to the increase in the radial distance of the cam surface 76 from the center of rotation of the shaft 58.

As shown in FIG. 2 the recesses 77 through 81 are spaced along the cam surface 76 so that as the cam 56 rotates in a counterclockwise direction as shown in FIG. 2, the tongue 54 of the follower 22 travels a greater and greater distance along the cam surface 76 in order to obtain the same increase in distance that the tongue is from the axis of rotation of the cam 56. In other words, as the cam 56 rotates in a counterclockwise direction as shown in FIG. 2, the tongue 54 must travel a greater and greater distance along the surface 76 in order to displace the tongue 54 a given distance away from the axis of rotation of the cam 56. This, in turn, causes the bent bar or rod 16 to rotate and thereby vary the position of the lumbar support plate 18.

The cam 56 also includes a nose or protuberance 86 which extends radially above the cam surface 76 immediately adjacent the last lumbar support position indicated by the recess 81. The protuberance 86 prevents movement of the tongue 54 from the last lumbar support position towards the first lumbar support position indicated by the recess 77 as the cam 56 rotates in a counterclockwise direction. Consequently, the cam 56 must be rotated in a clockwise position from the last lumbar support position indicated by the recess 81 in order to move the tongue 54 in any one of the other recesses 77 through 80 or to place the tongue 54 in the indented portion 84. Also, when the tongue 54 is in the recess 81, thereby placing the lumbar support plate 18 in the last lumbar support position, the spring force from the leaf spring 20 and through the follower 22, will be directed away from the axis of rotation of the cam 56 thereby tending to cause the cam 56 to rotate in a clockwise direction. Because of this, the cam 56 will be more securely held in the last lumbar support position to counteract the relatively large force exerted through the leaf spring 20.

The lumbar support regulating apparatus 10 is operated by rotating the handle 24 in a counterclockwise position as shown in FIGS. 1 or 2 to progressively adjust the firmness of the backrest 26 from soft, to medium and to hard. Consequently, the cam 56 will also be rotated in a counterclockwise direction about the axis of the shaft 58 so that the tongue 54 of the follower 22 will be sequentially engaged on the cam surface 76 between the recesses 77 and 78, between the recesses 78 and 79, between the recesses 79 and 80 and between the recesses 80 and 81. The distances on the cam face 76 from the center of rotation of the shaft 58 progressively increase which will tend to rotate the follower 22 away from the axis of rotation of the cam 56 and, consequently, rotate the bar 16. The bar 16, in turn, causes the leaf spring 20 to act with increasing force on the lumbar support plate 18 as the cam 56 is rotated.

Because the cam 56 must be rotated through a greater and greater angle to achieve the same angular displacement of the follower 22, the specific configuration of the cam surface 76 provides a greater mechanical advantage for the user of the apparatus 10 which is necessary to overcome the greater and greater force exerted by the leaf spring 20 on the lumbar support plate 18. The engagement of the tongue 54 with the recesses 77 through 81 will securely pull the cam 56 in its adjusted position. The indented portion 84 of the cam 56 provides the apparatus 10 with a rest or non-supportive position. The protuberance 86 of the cam 56 allows substantially the entire cam surface 76 to be utilized to cam the tongue 54 of the follower 22 and also to allow the recess 81 to be formed in such a fashion that force exerted by the leaf spring 20 through the tongue 54 will be directed away from the center of the axis of rotation of the cam 56 to more securely hold the cam 56 in the last lumbar support position.

While a preferred embodiment of the lumbar support regulating apparatus has been shown and described herein in detail, those skilled in this art will recognize various alternative designs and embodiments for practicing the present invention as defined by the following claims.

What is claimed is:

1. A lumbar support regulating apparatus comprising:
    a seat back having a rigid frame;
    a bar pivotally mounted on the frame for pivoting around a horizontal axis;
    a lumbar support plate;
    a cantilevered element supported by said bar for, in turn, supporting said lumbar support plate;
    a rigid follower having first and second end portions, the first end portion of the follower being attached at one end of the bar to rotate therewith;
    regulating means rotatably mounted on said frame and including a cam rotatable about a cam axis, the cam having a radially disposed external cam surface circumferentially extending in a first direction from a first lumbar support position through at least one intermediate lumbar support position to a last lumbar support position proximate the first lumbar support position, the cam surface being adapted for engagement with the second end portion of said follower wherein rotation of said regulating means in the first direction away from the first support position and towards the last lumbar support positions pushes the follower away from the axis of rotation of the cam to rotate said bar to thereby vary the position of the support plate, wherein a first radial distance between the cam axis and the cam surface at the first lumbar support position is less than a second radial distance between the cam axis and the cam surface at the intermediate lumbar support position which, in turn, is less than a third radial distance between the cam axis and the cam surface at the last lumbar support position and wherein the ratio of the difference between the first and second radial distances to the circumferential distance between the first and the intermediate lumbar support positions is greater than the ratio of the different between the second and third radial distances to the circumferential distance between the intermediate and last lumbar support position to thereby provide the cam with a greater and greater amount of mechanical advantage as the cam is rotated in the first direction, said second end portion of said follower including a tongue projection engageable with said cam surface, said cam surface having a recessed portion at each lumbar support position for receiving said tongue projection to hold said cam in a selected lumbar support position, said cam including a stop protuberance extending radially above said cam surface immediately adjacent and between the first and last lumbar support positions to prevent rotation of said cam beyond the last lumbar position said recessed portion at said first lumbar position extending radially deeper into said cam than the remaining recessed portions to lock said tongue projection into said first recessed portion against said stop protuberance to prevent movement in the opposite direction as said tongue projection is prevented by said first recessed portion and said stop protuberance from moving therepast.

2. The apparatus as defined in claim 1 wherein said regulating means includes a drive shaft having first and second ends, said cam being mounted on one end of said drive shaft to rotate therewith.

3. The apparatus as defined in claim 2 wherein said regulating means includes handle means operatively connected to the second end of the drive shaft outward of said frame for rotating said drive shaft.

4. The apparatus as defined in claim 2 wherein said regulating means includes bearing means for rotatably supporting said drive shaft on said frame.

* * * * *